United States Patent
Schick et al.

(10) Patent No.: US 10,374,891 B1
(45) Date of Patent: Aug. 6, 2019

(54) MULTI-REGION VIRTUAL DATA CENTER TEMPLATE

(71) Applicant: Skytap, Seattle, WA (US)

(72) Inventors: Bradley M. Schick, Seattle, WA (US); Sumit Mehrotra, Redmond, WA (US); Ross Andrus, Sammamish, WA (US); Matthew Hanlon, Seattle, WA (US); Yelena Branch, Seattle, WA (US)

(73) Assignee: Skytap, Seattle, WA (US)

(*) Notice: Subject to any disclaimer, the term of this patent is extended or adjusted under 35 U.S.C. 154(b) by 599 days.

(21) Appl. No.: 14/938,727

(22) Filed: Nov. 11, 2015

Related U.S. Application Data

(60) Provisional application No. 62/078,367, filed on Nov. 11, 2014.

(51) Int. Cl.
   *H04L 12/24* (2006.01)

(52) U.S. Cl.
   CPC ...... *H04L 41/0843* (2013.01); *H04L 41/0813* (2013.01)

(58) Field of Classification Search
   CPC .................................................. H04L 41/0843
   See application file for complete search history.

(56) References Cited

U.S. PATENT DOCUMENTS

| | | | |
|---|---|---|---|
| 7,933,987 B2 | 4/2011 | Aidun et al. | |
| 7,984,108 B2 | 7/2011 | Landis et al. | |
| 8,572,612 B2 | 10/2013 | Kern | |
| 8,589,916 B2 | 11/2013 | Gao et al. | |
| 8,806,486 B2 | 8/2014 | Martin et al. | |
| 8,990,806 B2 | 3/2015 | Morariu et al. | |
| 9,015,712 B1 | 4/2015 | Hodge et al. | |
| 9,021,478 B1 | 4/2015 | Wan et al. | |
| 9,043,786 B1 | 5/2015 | Hodge et al. | |
| 9,058,336 B1 | 6/2015 | Barker, Jr. et al. | |
| 9,098,345 B2 | 8/2015 | Jones et al. | |
| 9,866,581 B2 | 1/2018 | Lietz et al. | |
| 2006/0245354 A1 | 11/2006 | Gao et al. | |
| 2006/0253588 A1 | 11/2006 | Gao et al. | |
| 2006/0253848 A1 | 11/2006 | Mathieu et al. | |
| 2007/0028244 A1 | 2/2007 | Landis et al. | |
| 2007/0061441 A1 | 3/2007 | Landis et al. | |
| 2007/0067435 A1 | 3/2007 | Landis et al. | |
| 2007/0078982 A1 | 4/2007 | Aidun et al. | |
| 2008/0062250 A1* | 3/2008 | Rye ............... | H04N 5/23206 348/14.01 |
| 2008/0256531 A1 | 10/2008 | Gao et al. | |
| 2010/0228819 A1 | 9/2010 | Wei | |
| 2011/0258481 A1 | 10/2011 | Kern | |
| 2011/0258621 A1 | 10/2011 | Kern | |
| 2012/0072910 A1 | 3/2012 | Martin et al. | |
| 2012/0179817 A1 | 7/2012 | Bade et al. | |
| 2012/0226733 A1 | 9/2012 | Kim et al. | |
| 2012/0311115 A1 | 12/2012 | Kennedy et al. | |

(Continued)

*Primary Examiner* — Moustafa M Meky
*Assistant Examiner* — Sm Z Islam
(74) *Attorney, Agent, or Firm* — Perkins Coie LLP

(57) ABSTRACT

A facility for distributing a template recording a past state of a virtual computing environment is described. The facility accesses a list of physical data centers at which the template is to be available for immediate use to instantiate a new virtual computing environments. The facility causes the template to be stored at each physical data center on the list.

6 Claims, 14 Drawing Sheets

(56) References Cited

U.S. PATENT DOCUMENTS

| | | |
|---|---|---|
| 2013/0145367 A1 | 6/2013 | Moss |
| 2013/0198354 A1* | 8/2013 | Jones .................... G06F 9/5072 709/223 |
| 2013/0290952 A1* | 10/2013 | Childers, Jr. ......... G06F 9/5077 718/1 |
| 2013/0346157 A1 | 12/2013 | Avrilionis et al. |
| 2014/0082350 A1 | 3/2014 | Zarfoss, III et al. |
| 2014/0156851 A1* | 6/2014 | Suami ................. G06F 9/45558 709/226 |
| 2014/0201735 A1 | 7/2014 | Kannan et al. |
| 2014/0229440 A1 | 8/2014 | Venkatesh et al. |
| 2014/0280796 A1 | 9/2014 | Pijewski |
| 2014/0282525 A1 | 9/2014 | Sapuram et al. |
| 2014/0324793 A1 | 10/2014 | Glazemakers |
| 2015/0006614 A1 | 1/2015 | Suryanarayanan et al. |
| 2015/0019733 A1 | 1/2015 | Suryanarayanan et al. |
| 2015/0261552 A1 | 9/2015 | Hodge et al. |
| 2015/0263904 A1 | 9/2015 | Jones et al. |
| 2015/0331689 A1 | 11/2015 | Blahaerath et al. |
| 2015/0347165 A1 | 12/2015 | Lipchuk et al. |
| 2015/0370607 A1 | 12/2015 | Hodge et al. |
| 2015/0381641 A1 | 12/2015 | Cabrera et al. |
| 2015/0381651 A1 | 12/2015 | Lietz et al. |
| 2017/0364713 A1 | 12/2017 | Speak et al. |
| 2018/0046620 A1* | 2/2018 | Sasaki ................... G06F 17/302 |

* cited by examiner

| | templates table /—700 |
|---|---|
| template id | template name |
| 73291467 | Ajax Sales Demo |

| | | | | template instances table /—750 |
|---|---|---|---|---|
| template instance id | template id | location | creation time | pointer to saved template instance state |
| 92837462 | 73291467 | Beijing | 1/15/2014 14:07:03.211 | <pointer 1> |
| 44318873 | 73291467 | Sydney | 2/01/2014 9:11:14.036 | <pointer 2> |
| 11062344 | 73291467 | Chicago | 2/01/2014 9:11:46.013 | <pointer 3> |

MULTI-REGION VIRTUAL DATA CENTER TEMPLATE

CROSS-REFERENCE TO RELATED APPLICATION

This application claims the benefit of priority to U.S. Provisional Patent Application No. 62/078,367 entitled "MULTI-REGION VIRTUAL DATA CENTER TEMPLATE," filed on Nov. 11, 2014, which is hereby incorporated by reference in its entirety.

BACKGROUND

Some virtual computing embodiments make use of environments. An environment is a virtual workspace, or "virtual data center," that contains virtual infrastructure such as one or more virtual machines (VM), one or more networks, network connections, and one or more computational services. An environment also defines how VMs reach the public Internet, corporate data centers via VPN, and/or computational services external to the environment. Environments are used to contain and execute software applications. A typical example is a hotel reservation system. An environment may be running, suspended, stopped, or powered off. The exact state of an environment can be saved as a template. A template is a read-only definition of a complete virtual data center and includes the virtual infrastructure, computational services, applications state, and connections to external resources. Templates may be simple, containing only a single VM, or quite complex, containing hundreds of VMs spanning multiple networks. An environment can be instantiated from a template. Instantiating an environment from a template typically involves selecting one of a number of different physical data centers in which the template is to be instantiated as an environment. For instantiation in a remote data center selection, data constituting the template is copied from wherever it resides to the selected physical data center as part of the instantiation process.

BRIEF DESCRIPTION OF THE DRAWINGS

FIG. 7A is a table diagram showing sample contents of a templates table used by the facility in some embodiments to track templates created from environments.

FIG. 7B is a table diagram showing sample contents of a template instances table used by the facility in some embodiments to track the geographic replication of instances of each template.

DETAILED DESCRIPTION

Figure 1:
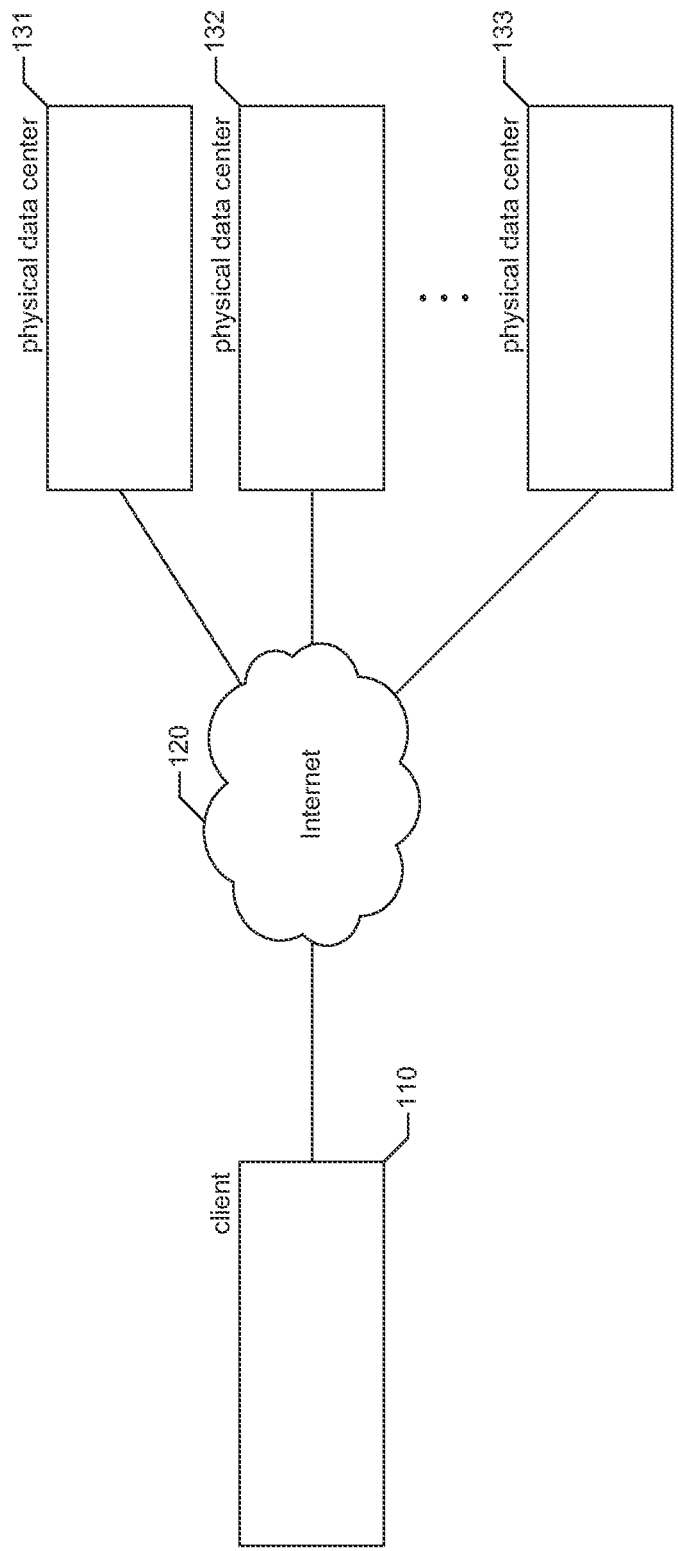
FIG. 1 is a network diagram showing an environment in which the facility operates in some embodiments.

The inventors have recognized that conventional processes for instantiating an environment from a template suffer from unwelcome latency that results from the time required to copy the data constituting the template across significant geographic distances to the physical data center where the environment is instantiated. As the number of templates and desired locations increase, these problems become more acute.

Accordingly, the inventors have conceived and reduced to practice a software and/or hardware facility ("the facility") that maintains the data making up a template simultaneously at multiple selected physical data centers. This allows an environment to be quickly instantiated from a single template at any of these physical data centers, without having to incur the time cost of copying the template data at the time of environment instantiation.

In some embodiments, the facility provides a user interface that a user may use to specify for the template, from among a list of available physical data centers, those in which instances of the template should be immediately available to quickly instantiate the environment represented by the template. These copies at each of multiple data centers are referred to herein as "instances" of the template.

In some embodiments, the template remains monolithic, in that a single template reference refers to the template and all of its distributed instances. In such embodiments, the template and all of its distributed instances can be deleted or updated with a single operation performed with respect to the template.

In some embodiments, the facility enables a user to replace an existing template with a new template based upon the state of an environment. After doing so, references that formerly pointed to the original template point to the new template. In some embodiments, the facility provides a user interface that the user may use in order to identify the existing template that is to be saved over, and the environment from whose state the new template is to be generated (i.e., whose state is to be reflected by the replacement template).

In some embodiments, in the facility's replication of a template instance between data centers, the facility identifies in the template instance being replicated one or more region-specific resources; these are resources that are usable in the context of one or more geographic regions, but not usable in others. For example, in some embodiments, an environment, and correspondingly a template created from that environment and its instances, can make a particular virtual machine of the environment accessible via the Internet at a particular IP address. Because Internet-valid IP addresses are assigned in distinct blocks by regional authorities, an external IP address assigned to a virtual machine that is part of an environment instantiated at a first center is often not usable to connect to the corresponding virtual machine at a different data center. Some additional types of resources are region-specific based on their reliance on an external IP address, including resources such as VPN tunnels to connect a virtual machine, via its external IP address, securely to an external network node; and instances Inter-Environment Network Routing to connect a virtual machine, via its external IP address, to a virtual machine of a different environment. When the facility identifies one or more such regional-specific resources in a template instance being replicated to a different data center, in the new template instance, the facility substitutes for each region-specific resource a corresponding region-specific resource that can be used in the target data center for the for the new template instance. In various embodiments, in performing this substitution, the facility selects from a pool of external IP addresses or region-specific resources of other types available at the target data center. In some embodiments, this is done automatically by the facility; in some embodiments, this is done by the facility based on user input to select the IP addresses.

By performing in some or all of the manners described above, the facility makes the use of templates in a virtual computing environment—such as a distributed virtual computing environment—more useful.

FIG. 1 is a network diagram showing an environment in which the facility operates in some embodiments. The environment includes a client computer system 110. This client is used by a user to interact with virtual computing environments hosted in any of a number of physical data centers, such as physical data centers 131-133. These physical data centers can be located in a variety of different geographic locations. The client interacts with each physical data center hosting virtual computing environments via the Internet 120 or another network. In various embodiments, this communication enables the user to instantiate an environment—such as from a template; monitor and control execution of the environment; and save the state of the environment as a template. In some embodiments, the user performs these interactions using a web browser program executing on the client computer system, which interacts with a web server located in each of the physical data centers. In some embodiments, the facility exposes an Application Programming Interface to allow template instances to be managed programmatically.

Figure 2:
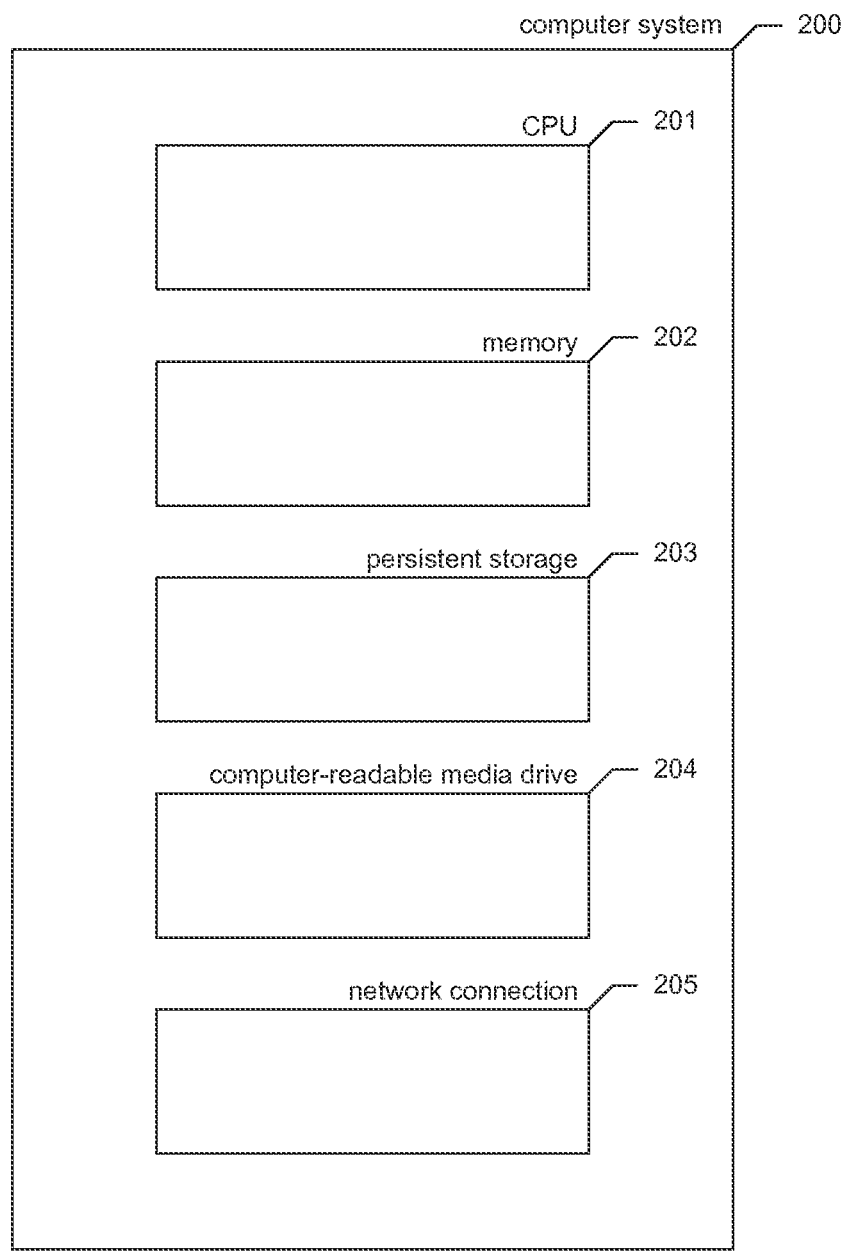
FIG. 2 is a block diagram showing some of the components typically incorporated in at least some of the clients, servers, and other devices on which the facility operates.

FIG. 2 is a block diagram showing some of the components typically incorporated in at least some of the clients, servers, and other devices on which the facility operates. In various embodiments, these devices 200 can include server computer systems, desktop computer systems, laptop computer systems, netbooks, mobile phones, personal digital assistants, televisions, cameras, automobile computers, electronic media players, computer cards, etc. In various embodiments, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and environments, and having various components.

Figure 3:
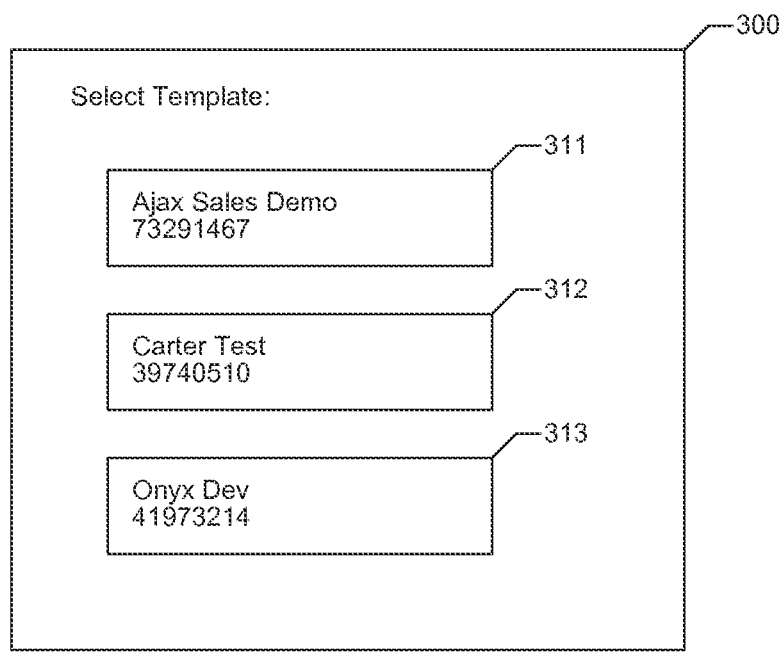
FIG. 3 is a display diagram showing a typical visual user interface provided by the facility in some embodiments to permit a user to select from among available stored templates.

FIG. 3 is a display diagram showing a typical visual user interface provided by the facility in some embodiments to permit a user to select from among available stored templates. A display 300 includes direction to select a template, and controls 311-313 each for selecting a different stored template. For example, the user may click on or otherwise activate control 311 to select an "Ajax Sales Demo" template having the template identifier "73291467."

Figure 4:
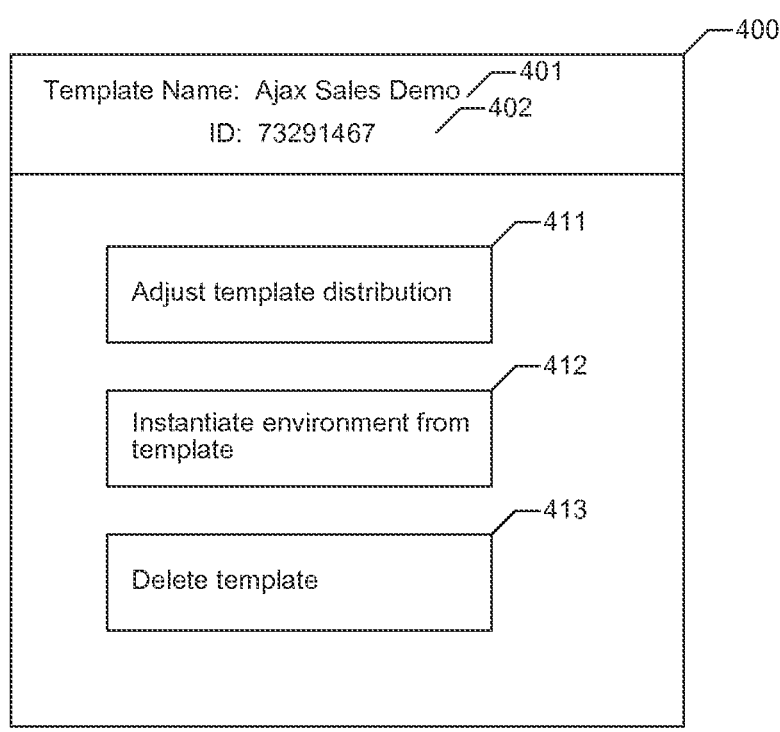
FIG. 4 is a display diagram showing a typical visual user interface presented by the facility in order to permit the user to select an action to perform with respect to a selected template.

FIG. 4 is a display diagram showing a typical visual user interface presented by the facility in order to permit the user to select an action to perform with respect to a selected template. The display 400 includes the name 401 and the identifier 402 of the template selected by activating control 311 in FIG. 3. The display further contains controls 411-413. The user can activate control 411 in order to adjust the distribution of instances of the selected template among the available data centers. The user can activate control 412 in order to instantiate a new environment using the selected template. The user can activate control 413 in order to delete the template and all associated template instances.

Figure 5:
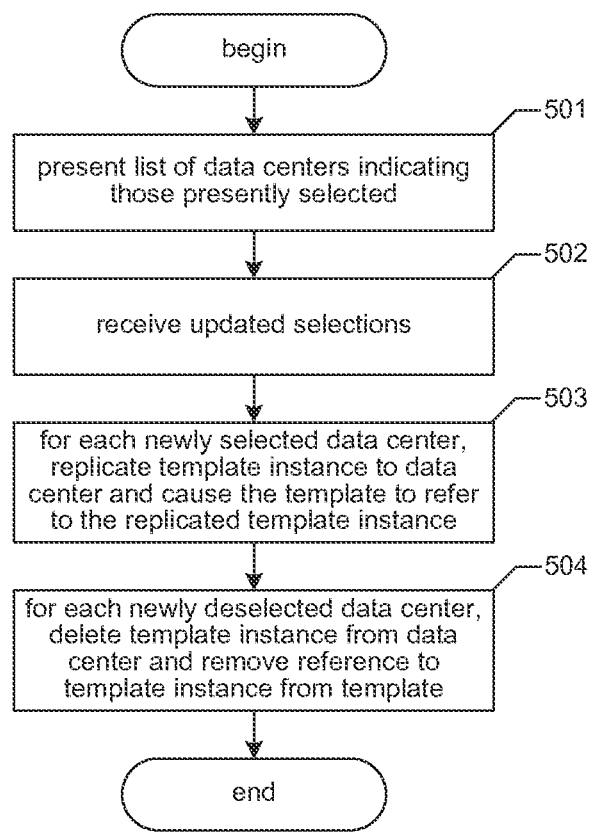
FIG. 5 is a flow diagram showing steps typically performed by the facility in some embodiments in order to adjust the distribution of a template across data centers.

FIG. 5 is a flow diagram showing steps typically performed by the facility in some embodiments in order to adjust the replication across data centers. For example, in some embodiments, the facility performs the steps shown in FIG. 5 in response to the user activating control 411 shown in FIG. 4. In step 501, the facility presents a list of available data centers and identifies those data centers presently selected to store instances of the selected template. In step 502, the facility receives from the user input specifying an updated set of data center selections. For example, the user can select formerly unselected data centers, and deselect formerly selected data centers. In step 503, for each newly selected data center reflected in the user input received in step 502, the facility replicates template instances to that data center and causes the template to refer to them. In some embodiments, the facility performs mapping of region-specific resources in the replicated template instances to be usable in each target data center, such as in some or all of the manners described above. In step 504, for each newly deselected data center specified by the user input received in step 502, the facility deletes the template instances from this data center and removes the reference from the template to the deleted template instances. After step 504, these steps conclude.

Those skilled in the art will appreciate that the steps shown in FIG. 5 and in each of the flow diagrams discussed below may be altered in a variety of ways. For example, the order of the steps may be rearranged; some steps may be performed in parallel; shown steps may be omitted, or other steps may be included; a shown step may divided into substeps, or multiple shown steps may be combined into a single step, etc.

Figure 6:
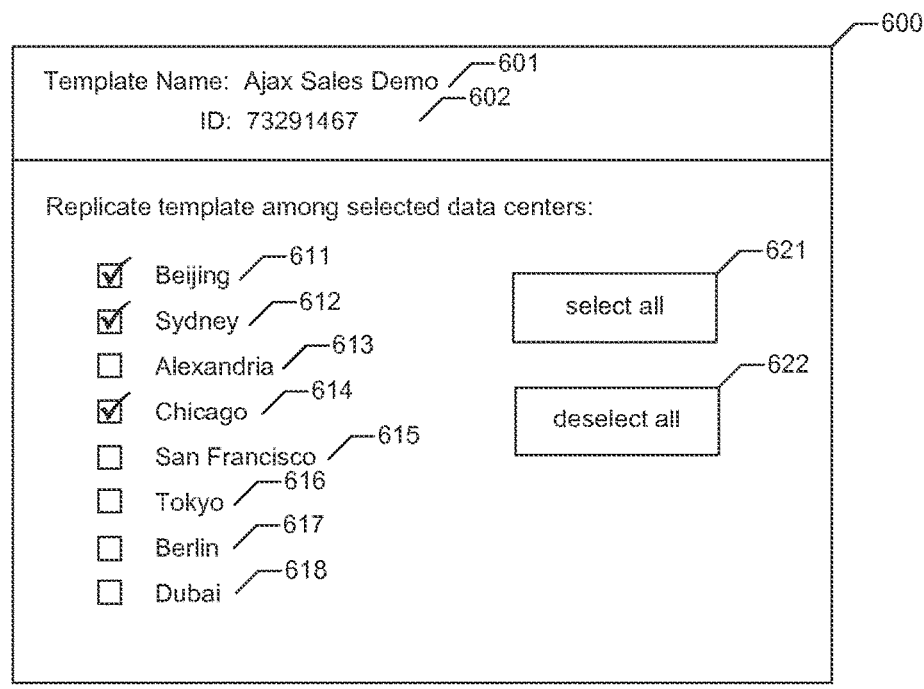
FIG. 6 is a display diagram showing a typical visual user interface presented by the facility in some embodiments to permit the user to adjust the geographic replication of a selected template.

FIG. 6 is a display diagram showing a typical visual user interface presented by the facility in some embodiments to permit the user to adjust the geographic replication of a selected template. The display 600 contains the selected template's name 601 and identifier 602. It further directs the user to select the data centers among data centers 611-618 to which instances of the template should be replicated. It can be seen here that the user has selected data centers 611, 612, and 614 by checking the associated boxes. The display also contains a control 621 that the user can activate in order to select all of the listed data centers, as well as a control 622 that the user can select in order to deselect all of the listed data centers, effectively deleting the template and all of its instances. Based upon the user input provided as shown in FIG. 6, the facility will replicate template instances for the selected template to any of data centers 611, 612, and 614 where it is not presently stored, and delete template instances for the selected template from any of data centers 613 and 615-618 where they are presently stored.

FIG. 7A is a table diagram showing sample contents of a templates table used by the facility in some embodiments to track templates created from environments. The templates table 700 is made up of rows each corresponding to a different template, such as row 701. Each row is divided into the following columns: a template identifier column 711 containing an identifier uniquely identifying the template; and a template name column 712 containing a name specified for the template to which the row corresponds. The facility uses each row's template identifier to connect it to instances of the template stored at particular data centers.

While FIG. 7A and the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information in each row than shown; may be compressed and/or encrypted; may contain a much larger number of rows than shown, etc.

FIG. 7B is a table diagram showing sample contents of a template instances table used by the facility in some embodiments to track the geographic replication of instances of each template. The template instances table 700 is made up of rows each corresponding to a different template instance, such as rows 751-753. Each row is divided into the following columns: a template instance identifier column 761 containing an identifier identifying the template instance to which the row corresponds; a template id column 762 containing a template identifier identifying the template of which the template instance to which the row corresponds is an instance; a location column 763 identifying the data center in which the template instance is stored; a creation time column 764 indicating the date and time at which the template instance was stored at the data center; and a pointer to saved state column 765 containing information usable to access the template instanced stored at the data center, such as a network path or other file identifier. It can be seen from the contents of rows 701 in FIG. 7A and row 751 in FIG. 7B that an instance of the "Ajax Sales Demo" template having template identifier 73291467 was stored at the Beijing data center on Jan. 15, 2014 at 14:07:03.211 and can be accessed there using <pointer1>. It can be seen from rows 752-753 in FIG. 7B that additional instances of this template are also stored in the Sydney and Chicago data centers. Each time a user changes the geographic distribution of a template such as by using the visual user interface shown in FIG. 6, the facility updates the template instances table to reflect these changes. Additionally, each time a new template is created, the facility adds a row corresponding to the created template to the template table, and at least one new template instance to the template instances table for the new template. In some embodiments (not shown), the template instances table further includes additional columns, such as a version column identifying the version of a template instance to which each row corresponds, and a superseded column indicating whether the template instance to which the row corresponds has been superseded by a newer version, or has been deleted.

Figure 8:
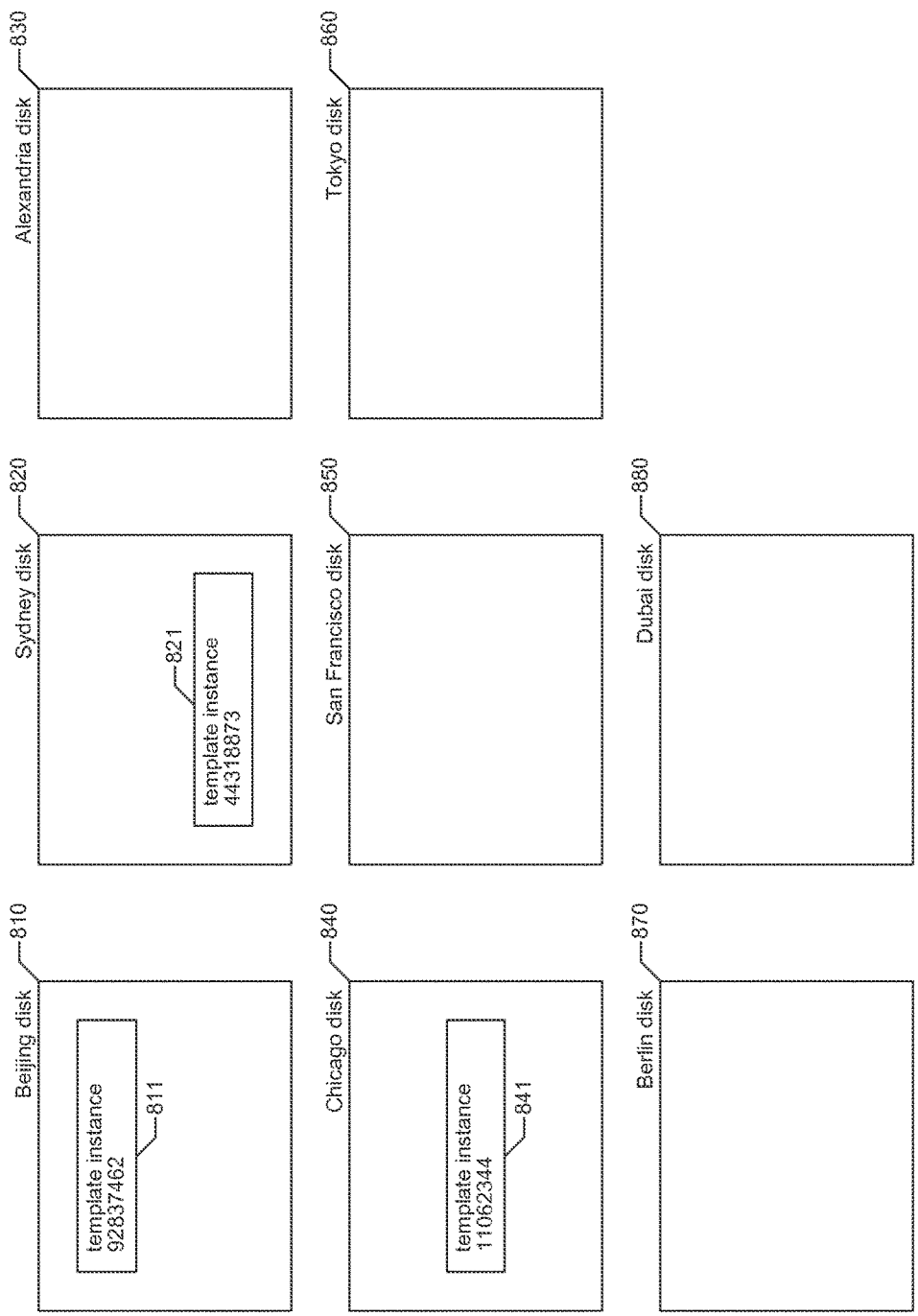
FIG. 8 is a storage diagram showing sample contents of persistent storage devices such as hard disks at each of a number of different physical data centers that can store copies of a template.

FIG. 8 is a storage diagram showing sample contents of persistent storage devices such as hard disks at each of a number of different physical data centers. These include one or more disks 810 at the Beijing data center, one or more disks 820 at the Sydney data center, one or more disks 830 at the Alexandria data center, one or more disks 840 at the Chicago data center, one or more disks 850 at the San Francisco data center, one or more disks 860 at the Tokyo data center, one or more disks 870 at the Berlin data center, and one or more disks 880 at the Dubai data center. It can be seen that, consistent with the selection of the Beijing, Sydney, and Chicago data centers reflected in FIGS. 6 and 7, the facility has stored an instance 92837462 of the 73291467 template on the Beijing disks 810 (as template instance 811), instance 44318873 on the Sydney disks 820 (as template instance 821), and instance 11062344 on the Chicago disks 840 (as template instance 841). For any newly-selected data center, the facility will copy template instances to that data center's disks. For any newly-deselected data center, the facility will delete template instances from that data center's disks. If the template is replaced with a new template, the facility will replace each template instance of the original template on a data centers' disks with a copy of the replacement template instance create from the contents of the selected environment. If the template is deleted, the facility will remove the template and all template instances from each of the data centers' disks.

Figure 9:
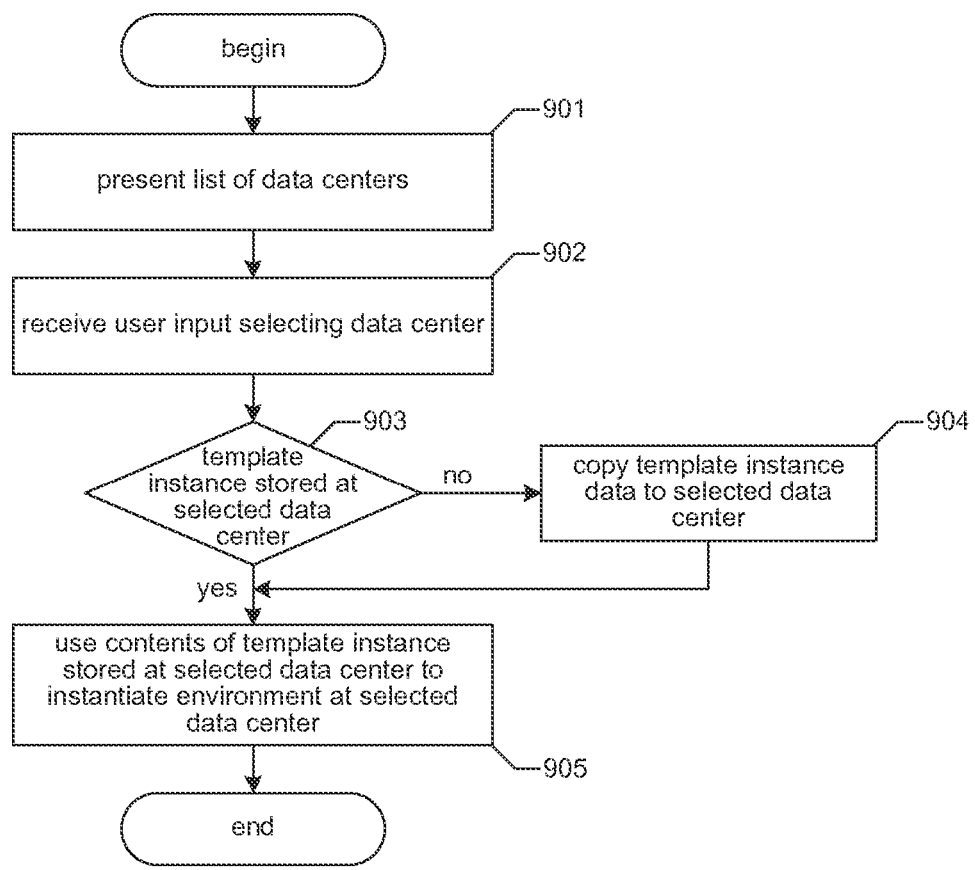
FIG. 9 is a flow diagram showing steps typically performed by the facility in some embodiments in order to instantiate an environment from a selected template.

FIG. 9 is a flow diagram showing steps typically performed by the facility in some embodiments in order to instantiate an environment from a selected template. For example, in some embodiments, the facility performs these steps when the user activates control 412 shown in FIG. 4. In step 901, the facility presents a list of data centers.

Figure 10:
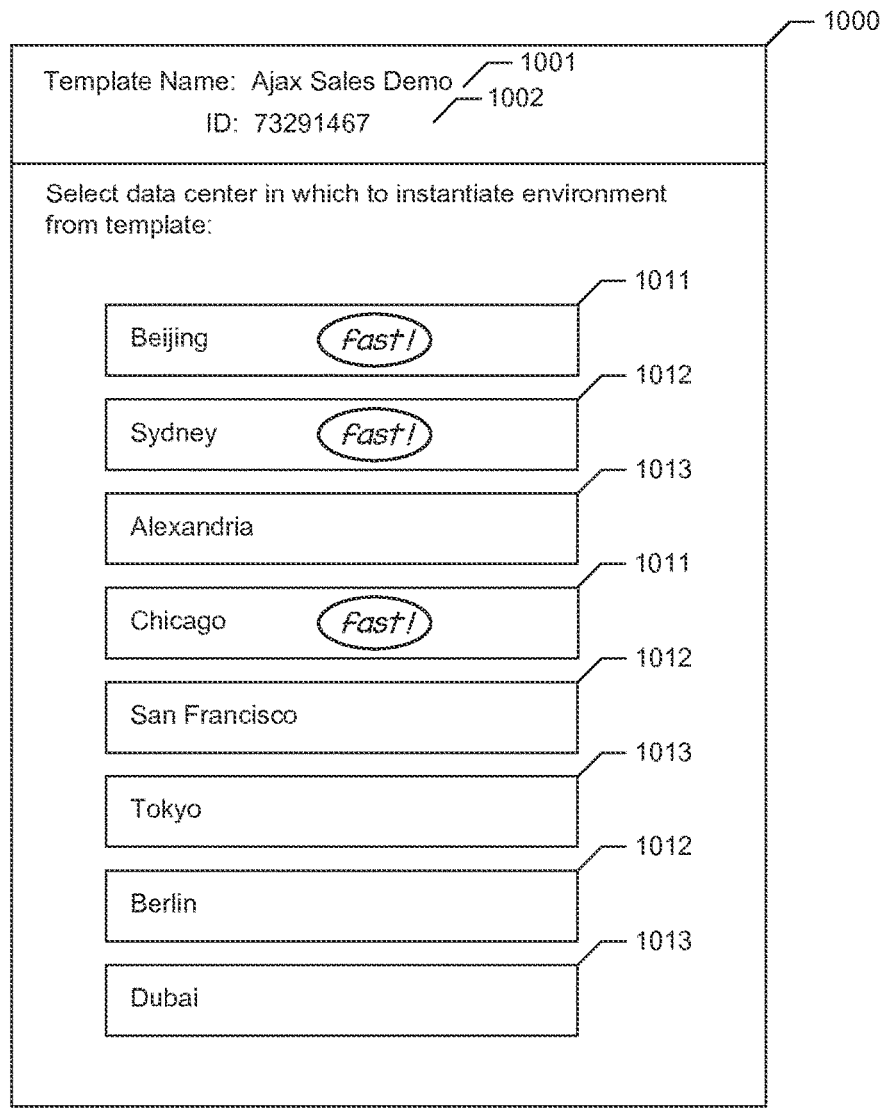
FIG. 10 is a display diagram showing a typical visual user interface presented by the facility in some embodiments in order to present a list of available data centers.

FIG. 10 is a display diagram showing a typical visual user interface presented by the facility in some embodiments in order to present a list of available data centers. The display 1000 includes the name 1001 and identifier 1002 of the selected template. The display further includes a direction to select a data center in which to instantiate an environment from the selected template. Further included are controls 1011-1018, each corresponding to a different data center and available for the user to activate in order to instantiate an environment from the selected template in that data center. It can be seen that controls 1011, 1012, and 1014, corresponding to the Beijing, Sydney, and Chicago data centers, respectively, contain an extra indication that instantiation of the environment will proceed quickly in any of those data centers as the result of the selected template having instances stored at those data centers.

For example, the user may operate control 1011 in order to cause an environment to be instantiated from the selected template in the Beijing data center.

Returning to FIG. 9, in step 902, the facility receives user input selecting a data center. In step 903, if the template is stored at the selected data center, then the facility continues to step 905, else the facility continues in step 904. In some embodiments, the facility determines whether a template instance is stored at the selected data center in step 903 by consulting the template instance table shown in FIG. 7B, such as at the intersection of row 751 and column 763 for the combination of the Ajax Sales Demo template in the Beijing data center. When an instance is stored in the selected data center, the flow proceeds directly to step 905 and quickly instantiates an environment in the selected data center from the local template instance data. In step 904, when a template instance is not stored in the selected data center, the facility copies the data from another remote template instance to the selected data center to instantiate an environment. In some embodiments, before performing step 904, the facility confirms with the user that it should do so. After step 904, the facility continues in step 905. In step 905, the facility uses the copied data to instantiate an environment at the selected data center. After step 905, these steps conclude.

Figure 11:
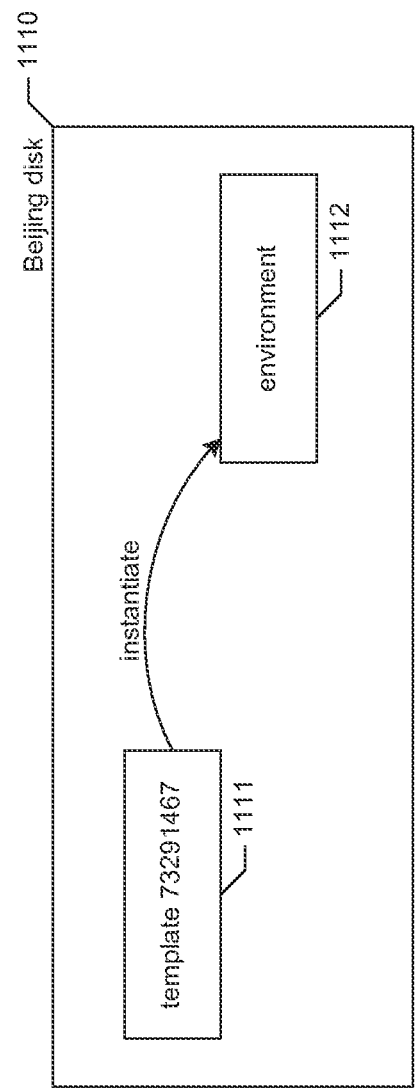
FIG. 11 is an instantiation diagram depicting the instantiation of an environment by the facility.

FIG. 11 is an instantiation diagram depicting the instantiation of an environment by the facility. It can be seen that the template instance 1111 stored on the disks 1110 at the Beijing data center is used to instantiate environment 1121. The instantiation clones the stored data in the template instance to create environment 1112 located at the Beijing data center. Because the resulting environment is located within the same data center as the template instance, and in some embodiments on the same disks, the instantiation operation completes faster than cross-data center environment instantiation.

Figure 12:
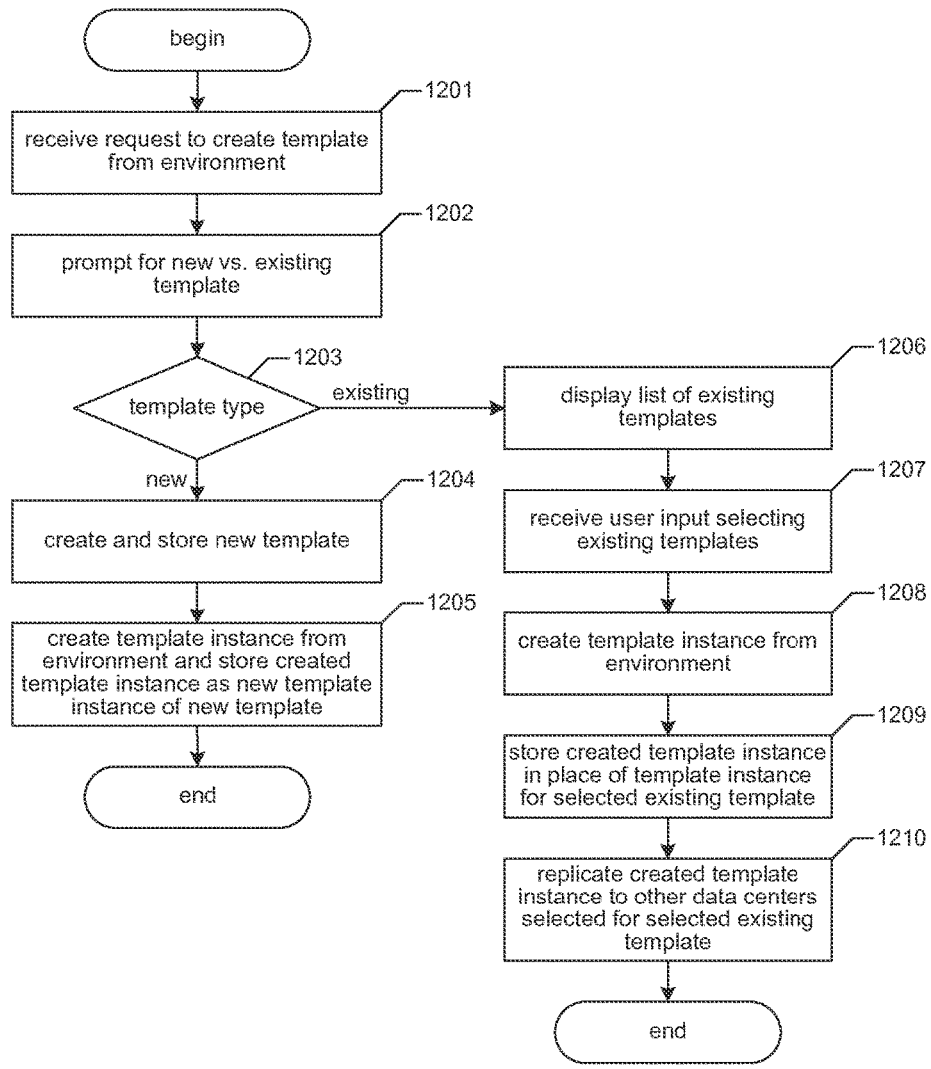
FIG. 12 is a flow diagram showing steps typically performed by the facility in order to create a template from an environment to represent the state of the environment at the time the template is created.

FIG. 12 is a flow diagram showing steps typically performed by the facility to create a template from an environment in order to represent the state of the environment at the time the template is created. Such a template can be used to replicate a large number of copies of the environment, to later return to this earlier state of the environment for either assessment or execution, etc.

Figure 13:
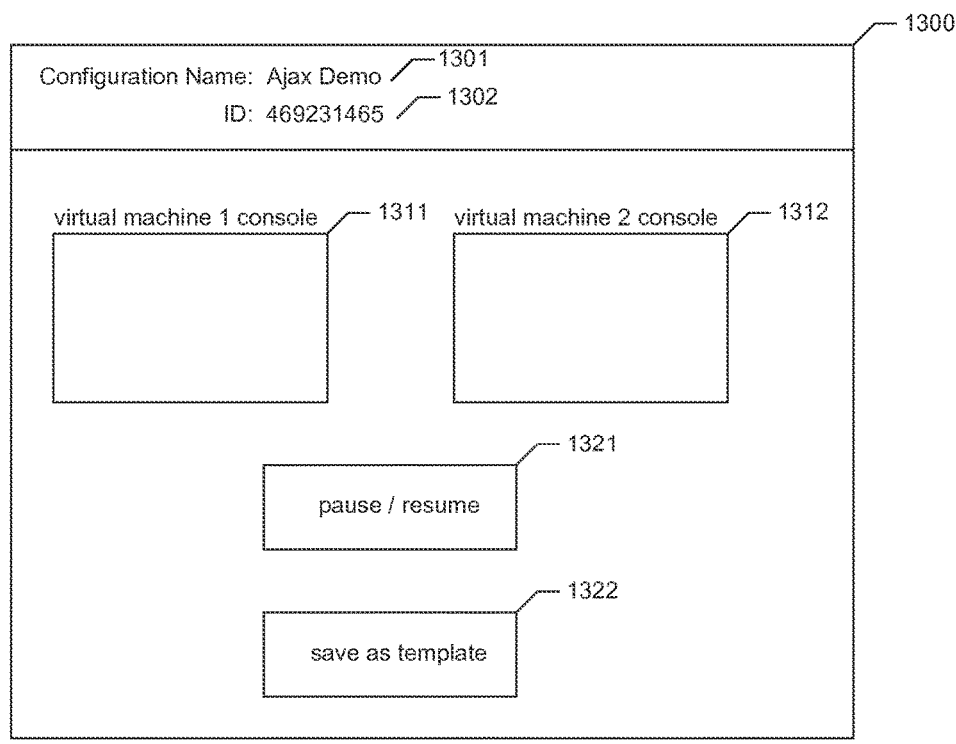
FIG. 13 is a display diagram showing a typical visual user interface presented by the facility in some embodiments to receive a request to create a template from an environment.

FIG. 13 is a display diagram showing a typical visual user interface presented by the facility in some embodiments to receive a request to create a template from an environment. The display 1300 contains the name 1301 and the identifier 1302 of a selected environment. It further includes consoles 1311 and 1312 each showing a visual representation of a different one of the virtual machines included in the environment. The display further includes a control 1321 that the user can activate in order to pause and resume execution of the virtual machines making up the environment. The display further includes a control 1322 that the user can activate in order to save the current state of the environment as a template.

Returning to FIG. 12, in step 1202, after receiving a request to create a template from a selected environment, such as by activation of control 1322 in FIG. 13, the facility prompts the user to specify whether the template in which the state of an environment is to be saved will be a new template, or whether it will be stored in place of an existing template. In step 1203, if the user specifies that it will be a new template, then the facility continues in step 1204, whereas if the user specifies that it will replace an existing template, the facility continues in step 1206. In step 1204, the facility creates a template and adds it to the templates table. In step 1205, the facility creates a new template instance from the environment and adds it to the template instance table with a pointer to the template created in 1204. In some embodiments (not shown), the facility automatically transitions to the process shown in FIG. 5 and the visual user interface shown in FIG. 6 to allow the user to specify the data centers in which the newly created template is replicated. After step 1205, these steps conclude.

In step 1206, where the user has specified to store the environment to be saved in place of an existing template, the facility displays a list of the existing templates.

Figure 14:
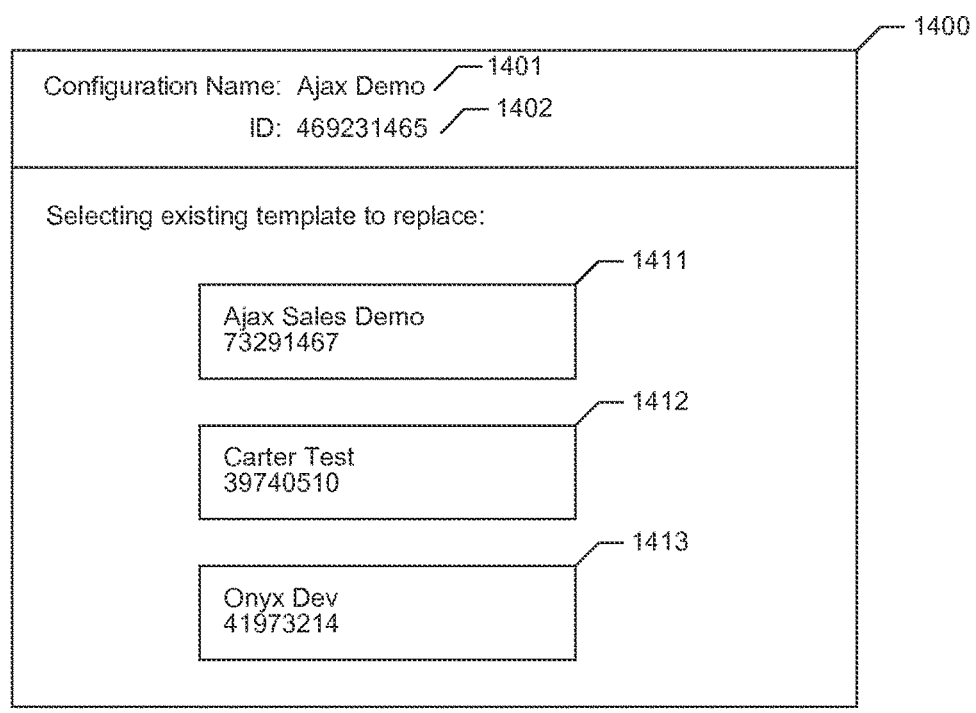
FIG. 14 is a display diagram showing a typical visual user interface presented by the facility in order to enable the user to select an existing template to replace with a new template.

FIG. 14 is a display diagram showing a typical visual user interface presented by the facility in order to enable the user to select an existing template to update with the current state of the selected environment. The display 1400 includes the name 1401 and identifier 1402 of the environment whose state will be used to create the template instance that will replace the template instances of the selected template. It further includes the direction to select an existing template whose instances are to be replaced, and controls 1411-1413 each corresponding to an existing template that is available to be updated by the current state of the selected environment. For example, the user can activate control 1411 in order to update the Ajax Sales Demo template by replacing the existing template instances with new template instances containing the current state of the selected "Ajax demo" environment.

Returning to FIG. 12, in step 1207, the facility receives user input selecting an existing template for update. In step 1208, in a manner similar to that used in step 1205, the facility creates a new template instance from the selected environment and adds it to the template instance table with a pointer to the selected existing template. In step 1209, the facility stores the created template in place of an existing template instance of the template selected by the user input received in step 1207. When template instances are stored in multiple locations, in step 1210, the facility replicates template instances to all data centers having an instance of that template. In some embodiments, steps 1208-1210 appear to be atomic from the perspectives of end users. In the case of the Ajax Sales Demo template selected as the template to update, the facility creates a new template instance from the current state of the selected environments. The template instance is replicated to all data center disks Beijing disks 810, Sydney disks 820, and Chicago disks 840 containing the old template instances. The old template instances are then removed from the template instance table. In some embodiments (not shown), the facility does not remove old template instance from the template instances table shown in FIG. 7B. In various embodiments, this allows the template to refer to both old and new versions of a template. After step 1210, these steps conclude.

In the figures discussed above, data centers in which templates may be stored and environments instantiated are identified based upon textual names for the cities in which they are located or near which they are located. In various embodiments, the facility identifies data centers in a variety of other ways, such as counties, states, countries, continents, or other types of geographic regions in which they are located. In various embodiments, the data centers are identified by showing their locations on a map, or by showing on a map regions containing the data centers.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A method in a computing system for managing the geographic distribution of instances of a template recording a past state of a virtual computing environment, the method comprising:
    causing to be displayed identification information of the template, wherein the identification information uniquely identifies the template among a plurality of templates;
    causing to be displayed visual indications of each of a plurality of physical data centers, wherein each visual indication uniquely identifies that physical data center;
    receiving user input selecting a subset of the visual indications of the displayed physical data centers;
    in response to the receiving, for each user-selected physical data center whose visual indication was selected by the user and where an instance of the template was not previously stored:
        transmitting the template to the user-selected physical data center; and
        causing the received template to be stored at the user-selected physical data center as a template instance; and
    for each of at least one of the user-selected physical data centers, in response to an instantiation request issued at a time after a replicated template instance is stored at the physical data center, instantiating an environment at that user-selected physical data center using contents of the template instance previously stored at that user-selected physical data center.

2. The method of claim 1 wherein the received user input selects a proper subset of the visual indications.

3. The method of claim 1 wherein the received user input selects all of the visual indications.

4. A method in a computing system for managing the geographic distribution of instances of a template recording a past state of a virtual computing environment, the method comprising:
    receiving programmatic invocation specifying information uniquely identifying the template among a plurality of templates and information uniquely identifying a plurality of selected physical data centers;
    in response to the receiving, for each selected physical data center where an instance of the template was not previously stored:
        transmitting the template to the selected physical data center; and
        causing the received template to be stored the selected physical data centers as a template instance; and
    for each of at least one of the selected physical data centers, in response to an instantiation request issued at a time after a replicated template instance is stored at the physical data center, instantiating an environment at that selected physical data center using contents of the template instance previously stored at that selected physical data center.

5. One or more computer memories collectively storing contents configured to cause a computing system to perform a method for replicating a template recording a past state of a virtual computing environment, the method comprising:
    causing to be displayed visual indications of each of a plurality of physical data centers, wherein each visual indication uniquely identifies that physical data center;
    for each of the plurality of physical data centers:
        determining whether a template instance of the template is stored at the physical data center;
        when the template instance of the template is stored at the physical data center:
            causing to be displayed a second visual indicator for the physical data center, wherein the second visual indicator denotes that the template instance is available for immediate use to instantiate a new virtual computing environment at the physical data center; and
    for each of at least one of the plurality of physical data centers, in response to an instantiation request issued at a time after a replicated template instance is stored at the physical data center, instantiating an environment at that physical data center using contents of the template instance previously stored at that physical data center.

6. The one or more computer memories of claim 5, further comprising:
    identifying a region-specific aspect of the template; and
    for each of the list of physical data centers, formulating the instance of the template stored at the physical data center by selecting a region-specific resource suitable for the physical data center in satisfaction of identified the region-specific aspect of the template.

* * * * *